US006980598B2

(12) United States Patent
Greenfield et al.

(10) Patent No.: US 6,980,598 B2
(45) Date of Patent: Dec. 27, 2005

(54) PROGRAMMABLE VERTICAL FILTER FOR VIDEO ENCODING

(75) Inventors: James D. Greenfield, Binghamton, NY (US); Barbara A. Hall, Endwell, NY (US); Agnes Y. Ngai, Endwell, NY (US); John M. Sutton, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 634 days.

(21) Appl. No.: 10/081,778

(22) Filed: Feb. 22, 2002

(65) Prior Publication Data

US 2003/0165197 A1 Sep. 4, 2003

(51) Int. Cl.[7] .............................................. H04N 7/12
(52) U.S. Cl. .............................................. 375/240.29
(58) Field of Search ...................... 375/240.01, 240.26, 375/240.29; 382/260; H04N 7/12

(56) References Cited

U.S. PATENT DOCUMENTS

| | | | |
|---|---|---|---|
| 4,882,627 A | 11/1989 | Keesen et al. ............... | 358/166 |
| 5,367,629 A | 11/1994 | Chu et al. .................... | 395/162 |
| 5,438,374 A | 8/1995 | Yan ............................. | 348/620 |
| 5,502,489 A | 3/1996 | Kim et al. ................... | 348/607 |
| 5,557,330 A | 9/1996 | Astle ........................... | 348/394 |
| 5,606,373 A | 2/1997 | Dopp et al. ................. | 348/459 |
| 5,621,465 A | 4/1997 | Kondo ........................ | 348/395 |
| 5,621,468 A | 4/1997 | Kim ............................ | 348/416 |
| 5,764,307 A | 6/1998 | Ozcelik et al. ............. | 348/608 |
| 5,867,221 A | 2/1999 | Pullen et al. ............... | 348/417 |
| 5,926,220 A | 7/1999 | Linzer ........................ | 348/931 |
| 5,926,224 A | 7/1999 | Nagasawa ................... | 348/413 |
| 5,953,506 A | 9/1999 | Kalra et al. ............ | 395/200.61 |
| 5,959,693 A | 9/1999 | Wu et al. ................... | 348/624 |
| 5,974,193 A | 10/1999 | Baudouin .................... | 382/261 |
| 5,977,947 A | 11/1999 | Potu ............................ | 345/127 |
| 6,005,626 A | 12/1999 | Ding ........................... | 348/416 |
| 6,037,986 A | 3/2000 | Zhang et al. ................ | 348/409 |
| 6,061,100 A | 5/2000 | Ward et al. ................. | 348/607 |
| 6,067,125 A | 5/2000 | May ............................ | 348/607 |
| 6,108,047 A | 8/2000 | Chen ........................... | 348/581 |
| 6,208,693 B1 | 3/2001 | Chen et al. ............. | 375/240.24 |
| 6,233,277 B1 | 5/2001 | Ozcelik et al. ......... | 375/240.02 |
| 6,539,120 B1 * | 3/2003 | Sita et al. ............... | 375/240.01 |

OTHER PUBLICATIONS

Clear Motion Integrated Noise Reduction System, DiviCom, Sep. 1999.

(Continued)

*Primary Examiner*—Young Lee
(74) *Attorney, Agent, or Firm*—William H. Steinberg, Esq.; Kevin P. Radigan, Esq.; Heslin Rothenberg Farley & Mesiti, P.C.

(57) ABSTRACT

A technique is provided for programmably vertically filtering pixel values of frames of a sequence of video frames. The technique includes separating luminance components and chrominance components of the pixel values within a vertical filter buffer, then vertically filtering luminance components of the pixel values using programmable luminance filter coefficients, and vertically filtering chrominance components of the pixel values using programmable chrominance filter coefficients. The filtered luminance component data and filtered chrominance component data is subsequently merged onto a single luminance/chrominance bus for further filtering and/or encoding. The luminance and chrominance filter coefficients are programmable and may be changed dynamically and repeatedly at picture boundaries. In one embodiment, the programmable vertical filter includes a four tap luminance component filter and a five tap chrominance component filter.

8 Claims, 9 Drawing Sheets

OTHER PUBLICATIONS

Interpolating Images To Higher Resolution Using A Feedforward 'Neural', IBM Technical Disclosure Bulletin, vol. 35, No. 1A, Jun. 1992.

"Design of HDTV subband filterbanks considering VLSI implementation constraints", Pestel, U.; Gruger, K., IEEE Trans. on Circuits and Systems for Video Technology, Mar. 1991, vol. 1, Is. 1, pp. 14-21.

Efficient DCT-Domain Pre-filtering inside a Video Encoder, S.D. Kim, et al., Proceedings of the SPIE—The International Society for Optical Engineering, vol. 4067, pt. 1-3, pp. 1579-1588.

J.D. Greenfield, et al., pending U.S. Appl. No. 09/838,758, filed Apr. 19, 2001, entitled "Simultaneous Vertical Spatial Filtering And Chroma Conversion in Video Images".

* cited by examiner fig. 2 fig. 3 fig. 4 fig. 5 fig. 6 fig. 7 fig. 8 fig. 9

PROGRAMMABLE VERTICAL FILTER FOR VIDEO ENCODING

CROSS-REFERENCE TO RELATED APPLICATIONS

This application contains subject matter which is related to the subject matter of the following applications, each of which is assigned to the same assignee as this application and filed on the same day as this application. Each of the below-listed applications is hereby incorporated herein by reference in its entirety:

"Programmable And Adaptive Temporal Filter For Video Encoding", by Murdock et al., U.S. Ser. No. 10/080,963;

"Programmable Horizontal Filter With Noise Reduction and Image Scaling For Video Encoding System", by Ngai et al., U.S. Ser. No. 10/080,745.

TECHNICAL FIELD

This invention relates, in general, to compression of digital visual images, and more particularly, to a technique for programmably vertically filtering pixel values of the frames of a sequence of motion video frames.

BACKGROUND OF THE INVENTION

Technological advances in digital transmission networks, digital storage media, very large scale integration devices, and digital processing of video and audio signals have been converging to make the transmission and storage of digital video economical in a wide variety of applications. Because the storage and transmission of digital video signals is central to many applications, and because an uncompressed representation of a video signal requires a large amount of storage, the use of digital video compression techniques is vital to this advancing art. In this regard, several international standards for the compression of digital video signals have emerged over the past decade, with more currently under development. These standards apply to algorithms for the transmission and storage of compressed digital video in a variety of applications, including: video-telephony and teleconferencing; high quality digital television transmission on coaxial and fiberoptic networks, as well as broadcast terrestrially and other direct broadcast satellites; and in interactive multimedia products on CD-ROM, Digital Audio Tape, and Winchester disk drives.

Several of these standards involve algorithms based on a common core of compression techniques, e.g., the CCITT (Consultative Committee on International Telegraphy and Telephony) Recommendation H.120, the CCITT Recommendation H.261, and the ISO/IEC MPEG-1 and MPEG-2 standards. The MPEG algorithms have been developed by the Moving Picture Experts Group (MPEG), part of a joint technical committee of the International Standards Organization (ISO) and the International Electrotechnical Commission (IEC). The MPEG committee has been developing standards for the multiplexed, compressed representation of video and associated audio signals.

The MPEG-2 standard describes an encoding method that results in substantial bandwidth reduction by a subjective lossy compression followed by a lossless compression. The encoded, compressed digital data is subsequently decompressed and decoded in an MPEG-2 compliant decoder. The MPEG-2 standard specifies a very high compression technique that achieves compression not achievable with intraframe coding alone, while preserving the random access advantages of pure intraframe coding. The combination of frequency domain intraframe encoding and interpolative/predictive interframe encoding of the MPEG-2 standard results in a balance between intraframe encoding and interframe encoding.

The MPEG-2 standard exploits temporal redundancy for motion compensated interpolative and predictive encoding. That is, an assumption is made that "locally" the current picture can be modeled as a translation of the picture at a previous and/or future time. "Locally" implies that the amplitude and direction of the displacement are not the same everywhere in the picture.

The MPEG-2 standard further specifies predictive and interpolative interframe encoding and frequency domain intraframe encoding. It has block-based motion compensation for the reduction of temporal redundancy and discrete cosine transform based compression for the reduction of spatial redundancy. Under MPEG-2, motion compensation is achieved by predictive coding, interpolative coding, and variable length coded motion vectors. The information relative to motion is based on a 16×16 array of pixels and is transmitted with the spatial information. It is compressed with variable length codes, such as Huffman codes.

The ISO MPEG-2 compression standard specifies only the syntax of bitstream and semantics of the decoding process. The choice of coding parameters and trade-offs in performance versus complexity are left to the encoder developers.

One aspect of the encoding process is compressing a digital video image into as small a bitstream as possible while still maintaining video detail and quality. The MPEG standard places limitations on the size of the bitstream, and requires that the encoder be able to perform the encoding process. Thus, simply optimizing the bit rate to maintain desired picture quality and detail can be difficult.

Preprocessing of digital video pictures can be advantageous to the digital video encoding process. Vertical filtering is one such preprocessing technique that can be used to soften input pictures to the encoder and thereby reduce noise. This results in better compression, without loss of quality.

DISCLOSURE OF THE INVENTION

Applicants recognize herein a limitation to a vertical filter such as described in co-pending, commonly assigned U.S. patent application Ser. No. 09/838,758, entitled "Simultaneous Vertical Spatial Filtering and Chroma Conversion In Video Images", the entirety of which is hereby incorporated herein by reference. Specifically, because vertical spatial filter coefficients are fixed, a vertical filter such as described therein may not be optimal for different types of video sources. The present invention eliminates this restriction by presenting a vertical filter, integrated for example within front end logic of a digital video encoder, which uses both luminance and chrominance coefficients that are dynamically programmable to, for example, perform enhanced on chip noise reduction.

Briefly summarized, the present invention comprises in one aspect a method of filtering pixels of video frames of a sequence of video frames for encoding. The method includes obtaining pixel values of video frames of the sequence of video frames; and programmably vertically filtering the pixel values of the video frames.

In enhanced embodiments, the programmably vertically filtering includes obtaining vertical filter coefficients for use in vertical filtering of pixel values. This obtaining of vertical filter coefficients can include dynamically obtaining new vertical filter coefficients while filtering the pixel values. For example, the vertical filter coefficients could be dynamically programmed by a user, and then be loaded into the vertical filtering process between frames of the sequence of video frames being filtered. In one embodiment, the vertical filter coefficients include at least two programmable luminance filter coefficients and at least two programmable chrominance filter coefficients, wherein the programmable vertical filter separately filters both the luminance components and the chrominance components of the pixel values in real time.

Systems and computer program products corresponding to the above-summarized methods are also described and claimed herein.

To restate, provided herein is a technique for programmably vertically filtering pixel values of frames of a sequence of motion video frames in real time. The technique is programmable since the coefficients employed in the filtering process are programmable and may be dynamically changed by a user during the encoding process. For example, one or more of the coefficients could be changed by a user on a per picture basis if desired. The programmable vertical filter disclosed herein can be integrated within a digital video encoder as preprocessing logic prior to the encode process. Such an embodiment would eliminate any need for a user to perform external filtering, and allows a user to improve picture quality dynamically using pre-loaded or user inputted sets of coefficients.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

The invention relates, for example, to MPEG compliant encoders and encoding processes such as described in "Information Technology-Generic coding of moving pictures and associated audio information: Video," Recommendation ITU-T H.262, ISO/IEC 13818-2, International Standard, 1996. The encoding functions performed by the encoder include data input, spatial compression, motion estimation, macroblock type generation, data reconstruction, entropy coding, and data output. Spatial compression includes discrete cosine transformation (DCT), quantization, and entropy encoding. Temporal compression includes intensive reconstructive processing, such as inverse discrete cosine transformation, inverse quantization, and motion compensation. Motion estimation and compensation are used for temporal compression functions. Spatial and temporal compression are repetitive functions with high computational requirements.

More particularly the invention relates, for example, to a process for performing spatial and temporal compression including discrete cosine transformation, quantization, entropy encoding, motion estimation, motion compensation, and prediction, and even more particularly to a system for accomplishing spatial and temporal compression.

The first compression step is the elimination of spatial redundancy, for example, the elimination of spatial redundancy in an "I" frame picture. Spatial redundancy is the redundancy within a picture. The MPEG-2 Standard uses a block based method of reducing spatial redundancy. The method of choice is the discrete cosine transformation, and discrete cosine transform coding of the picture. Discrete cosine transform coding is combined with weighted scalar quantization and run length coding to achieve a desirable compression.

The discrete cosine transformation is an orthogonal transformation. Orthogonal transformations, because they have a frequency domain interpretation, are filter bank oriented. The discrete cosine transformation is also localized. That is, the encoding process samples on an 8×8 spatial window which is sufficient to compute 64 transform coefficients or sub-bands.

Another advantage of the discrete cosine transformation is that fast encoding and decoding algorithms are available. Additionally, the sub-band decomposition of the discrete cosine transformation is sufficiently well behaved to allow effective use of psychovisual criteria.

After transformation, many of the frequency coefficients are zero, especially the coefficients for high spatial frequencies. These coefficients are organized into a zig-zag or alternate-scanned pattern, and converted into run-amplitude (run-level) pairs. Each pair indicates the number of zero coefficients and the amplitude of the non-zero coefficient. This is coded in a variable length code.

Motion compensation is used to reduce or even eliminate redundancy between pictures. Motion compensation exploits temporal redundancy by dividing the current picture into blocks, for example, macroblocks, and then searching in previously transmitted pictures for a nearby block with similar content. Only the difference between the current block pels and the predicted block pels extracted from the reference picture is actually compressed for transmission and thereafter transmitted.

One method of motion compensation and prediction is to record the luminance and chrominance, i.e., intensity and color, of every pixel in an "I" picture, then record changes of luminance and chrominance, i.e., intensity and color for every specific pixel in the subsequent picture. However, this is uneconomical in transmission medium bandwidth, memory, processor capacity, and processing time because objects move between pictures, that is, pixel contents move from one location in one picture to a different location in a subsequent picture. A more advanced idea is to use a previous or subsequent picture to predict where a block of pixels will be in a subsequent or previous picture or pictures, for example, with motion vectors, and to write the result as "predicted pictures" or "P" pictures. More particularly, this involves making a best estimate or prediction of where the pixels or macroblocks of pixels of the $i^{th}$ picture will be in the $i-1^{th}$ or $i+1^{th}$ picture. It is one step further to use both subsequent and previous pictures to predict where a block of pixels will be in an intermediate or "B" picture.

To be noted is that the picture encoding order and the picture transmission order do not necessarily match the picture display order. See FIG. 2. For I-P-B systems the input picture transmission order is different from the encoding order, and the input pictures must be temporarily stored until used for encoding. A buffer stores this input until it is used.

Figure 1:
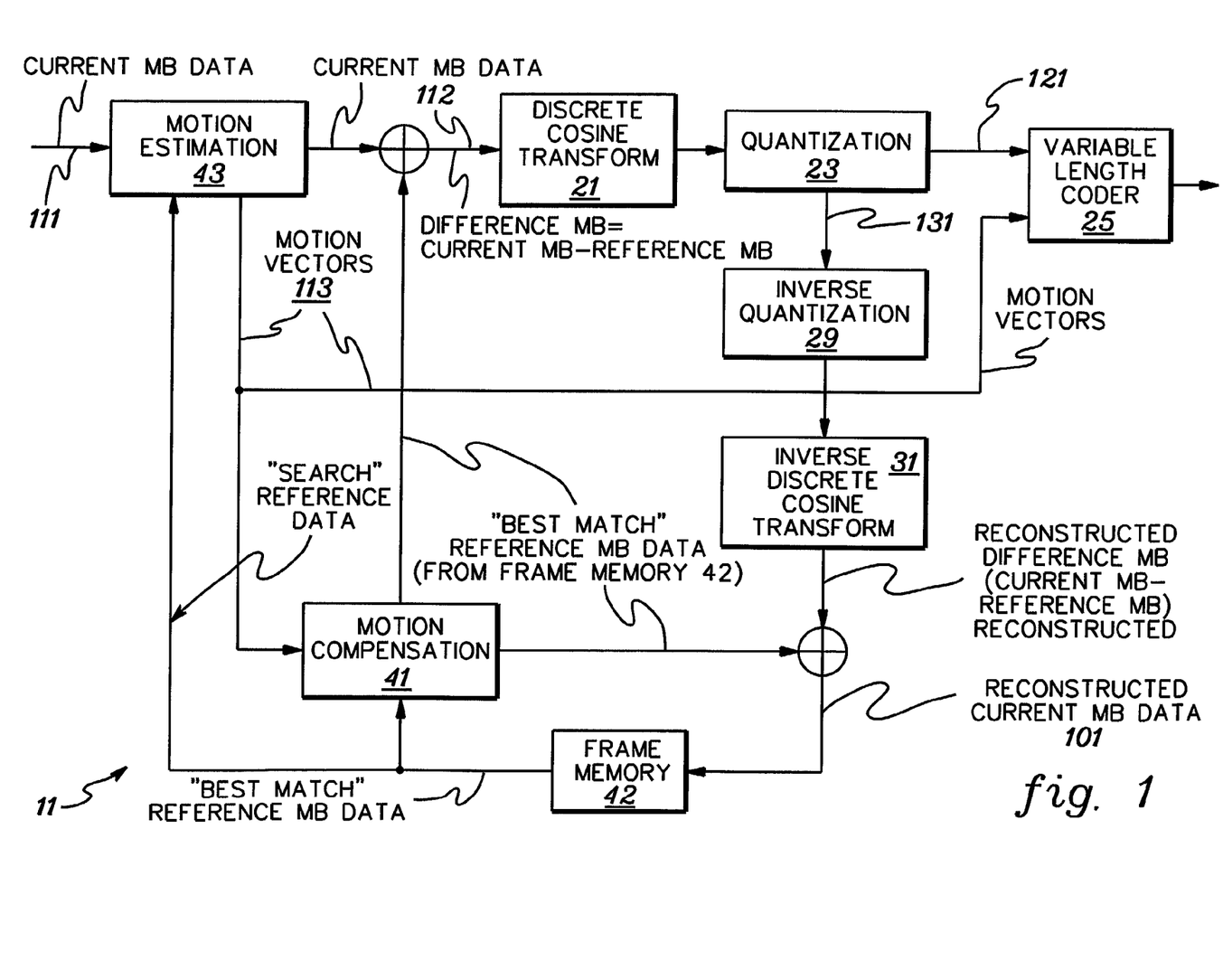
FIG. 1 shows a flow diagram of a generalized MPEG-2 compliant encoder 11, including a discrete cosine transformer 21, a quantizer 23, a variable length coder 25, an inverse quantizer 29, an inverse discrete cosine transformer 31, motion compensation 41, frame memory 42, and motion estimation 43. The data paths include the $i^{th}$ picture input 111, difference data 112, motion vectors 113 (to motion compensation 41 and to variable length coder 25), the picture output 121, the feedback picture for motion estimation and compensation 131, and the motion compensated picture 101. This figure has the assumptions that the $i^{th}$ picture exists in frame memory or frame store 42 and that the $i+1^{th}$ is being encoded with motion estimation.

For purposes of illustration, a generalized flowchart of MPEG compliant encoding is shown in FIG. 1. In the flowchart, the images of the $i^{th}$ picture and the $i+1^{th}$ picture are processed to generate motion vectors. The motion vectors predict where a macroblock of pixels will be in a prior and/or subsequent picture. The use of the motion vectors is a key aspect of temporal compression in the MPEG standard. As shown in FIG. 1 the motion vectors, once generated, are used for the translation of the macroblocks of pixels, from the $i^{th}$ picture to the $i+1^{th}$ picture.

As shown in FIG. 1, in the encoding process, the images of the $i^{th}$ picture and the $i+1^{th}$ picture are processed in the encoder 11 to generate motion vectors which are the form in which, for example, the $i+1^{th}$ and subsequent pictures are encoded and transmitted. An input image 111 of a subsequent picture goes to the motion estimation unit 43 of the encoder. Motion vectors 113 are formed as the output of the motion estimation unit 43. These vectors are used by the motion compensation unit 41 to retrieve macroblock data from previous and/or future pictures, referred to as "reference" data, for output by this unit. One output of the motion compensation unit 41 is negatively summed with the output from the motion estimation unit 43 and goes to the input of the discrete cosine transformer 21. The output of the discrete cosine transformer 21 is quantized in a quantizer 23. The output of the quantizer 23 is split into two outputs, 121 and 131; one output 121 goes to a downstream element 25 for further compression and processing before transmission, such as to a run length encoder; the other output 131 goes through reconstruction of the encoded macroblock of pixels for storage in frame memory 42. In the encoder shown for purposes of illustration, this second output 131 goes through an inverse quantization 29 and an inverse discrete cosine transform 31 to return a lossy version of the difference macroblock. This data is summed with the output of the motion compensation unit 41 and returns a lossy version of the original picture to the frame memory 42.

Figure 2:
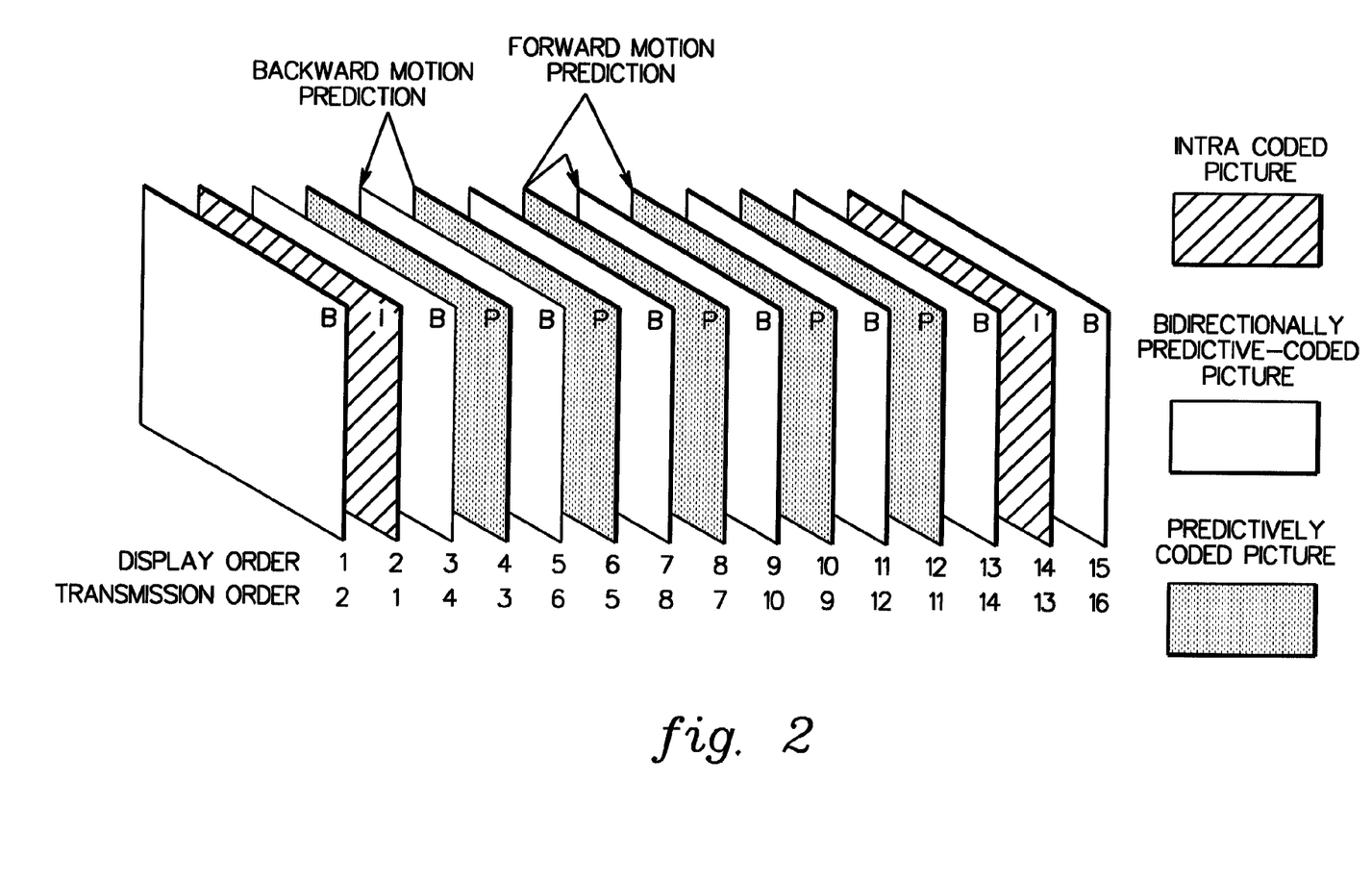
FIG. 2 illustrates the I, P, and B pictures, examples of their display and transmission orders, and forward, and backward motion prediction.

As shown in FIG. 2, there are three types of pictures. There are "Intra pictures" or "I" pictures which are encoded and transmitted whole, and do not require motion vectors to be defined. These "I" pictures serve as a reference image for motion estimation. There are "Predicted pictures" or "P" pictures which are formed by motion vectors from a previous picture and can serve as a reference image for motion estimation for further pictures. Finally, there are "Bidirectional pictures" or "B" pictures which are formed using motion vectors from two other pictures, one past and one future, and can not serve as a reference image for motion estimation. Motion vectors are generated from "I" and "P" pictures, and are used to form "P" and "B" pictures.

Figure 3:
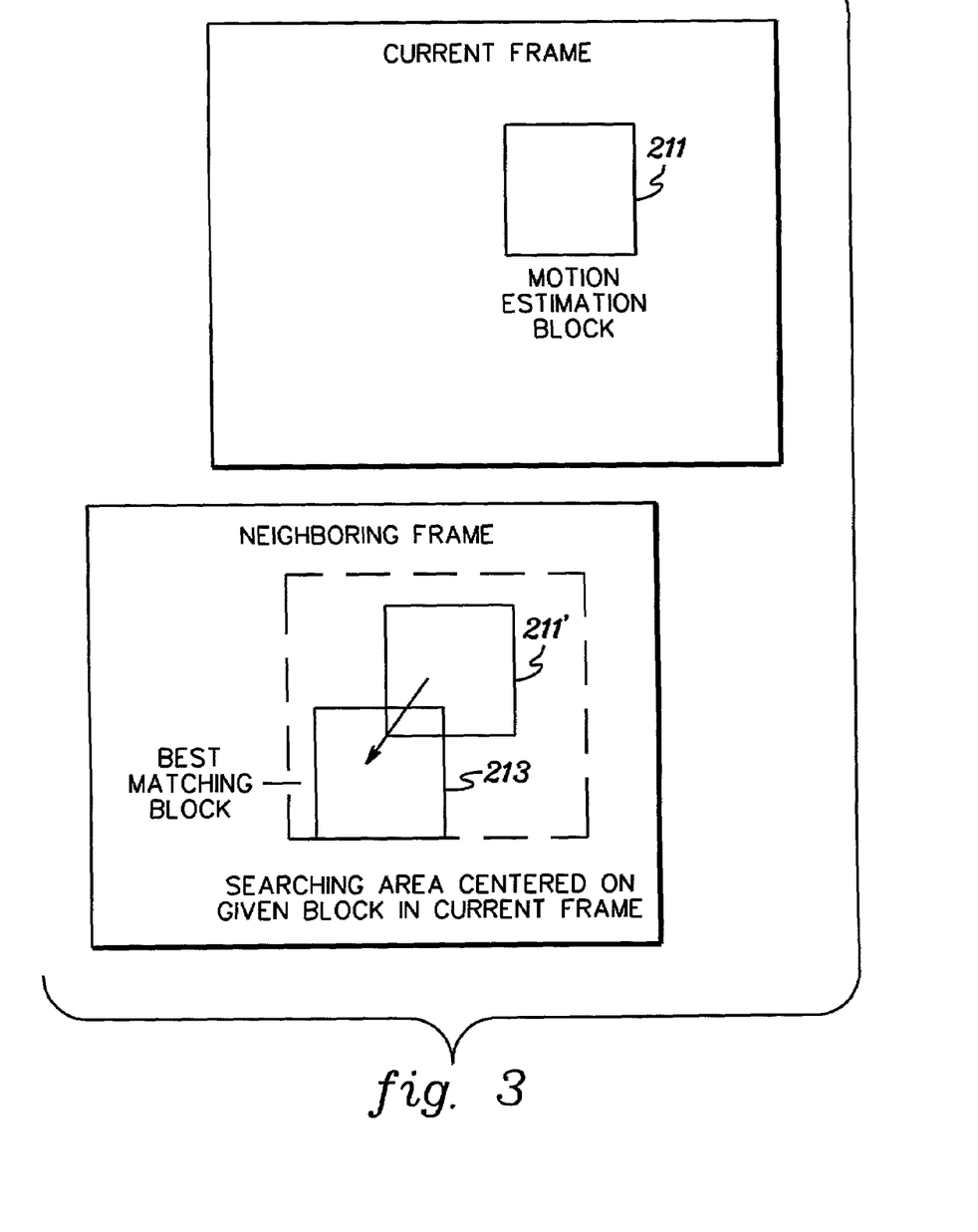
FIG. 3 illustrates the search from the motion estimation block in the current frame or picture to the best matching block in a subsequent or previous frame or picture. Elements 211 and 211' represent the same location in both pictures.
Figure 4:
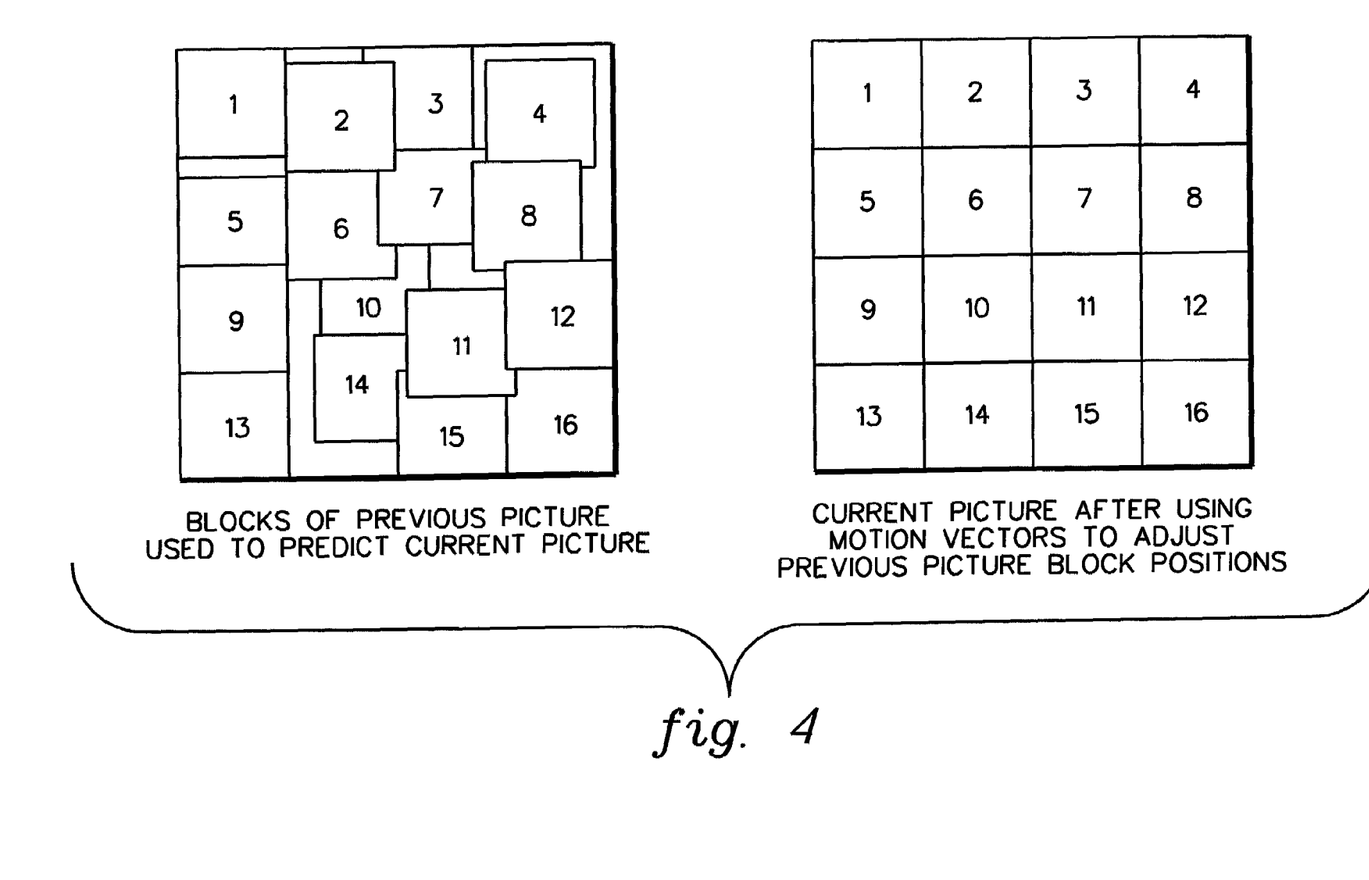
FIG. 4 illustrates the movement of blocks in accordance with the motion vectors from their position in a previous picture to a new picture, and the previous picture's blocks adjusted after using motion vectors.

One method by which motion estimation is carried out, shown in FIG. 3, is by a search from a macroblock 211 of an $i^{th}$ picture throughout a region of the next picture to find the best match macroblock 213. Translating the macroblocks in this way yields a pattern of macroblocks for the $i+1^{th}$ picture, as shown in FIG. 4. In this way the $i^{th}$ picture is changed a small amount, e.g., by motion vectors and difference data, to generate the $i+1^{th}$ picture. What is encoded are the motion vectors and difference data, and not the $i+1^{th}$ picture itself. Motion vectors translate position of an image from picture to picture, while difference data carries changes in chrominance, luminance, and saturation, that is, changes in shading and illumination.

Returning to FIG. 3, processing searches for a good match by starting from the same location in the ith picture as in the $i+1^{th}$ picture. A search window is created in the ith picture. We search for a best match within this search window. Once found, the best match motion vectors for the macroblock are coded. The coding of the best match macroblock includes a motion vector, that is, how many pixels in the y direction and how many pixels in the x direction is the best match displaced in the next picture. Also encoded is difference data, also referred to as the "prediction error", which is the difference in chrominance and luminance between the current macroblock and the best match reference macroblock.

The operational functions of an MPEG-2 encoder are discussed in further detail in U.S. Pat. No. 6,118,823 by Carr et al., entitled "Control Scheme For Shared-Use Dual-Port Predicted Error Array," which is hereby incorporated herein by reference in its entirety.

As noted above, vertical filtering can be employed to soften pictures to an encode process, and thereby reduce noise inherent in the raw pixel data to be encoded. A softened picture is one whose pixel values have been smoothed by such a function, allowing the encode process to proceed easier and the output to be more visually appealing. Noise manifests itself as random changes in pixel values and therefore can also be reduced through the same filtering technique.

Presented below are certain enhanced vertical filter implementations in accordance with aspects of the present invention.

Disclosed herein, in one aspect, is a vertical filter which employs both luminance coefficients and chrominance coefficients to dynamically perform vertical filtering, and thereby achieve noise reduction. In one embodiment, this vertical filter may be implemented on-chip (e.g., comprise hardware integrated onto a digital video encoder chip). This integration would eliminate the need for a user to perform external vertical filtering and, in accordance with one embodiment of the invention, would allow a user to improve picture quality dynamically using pre-loaded sets of-coefficients or dynamically inputted sets of luminance and chrominance coefficients.

Figure 5:
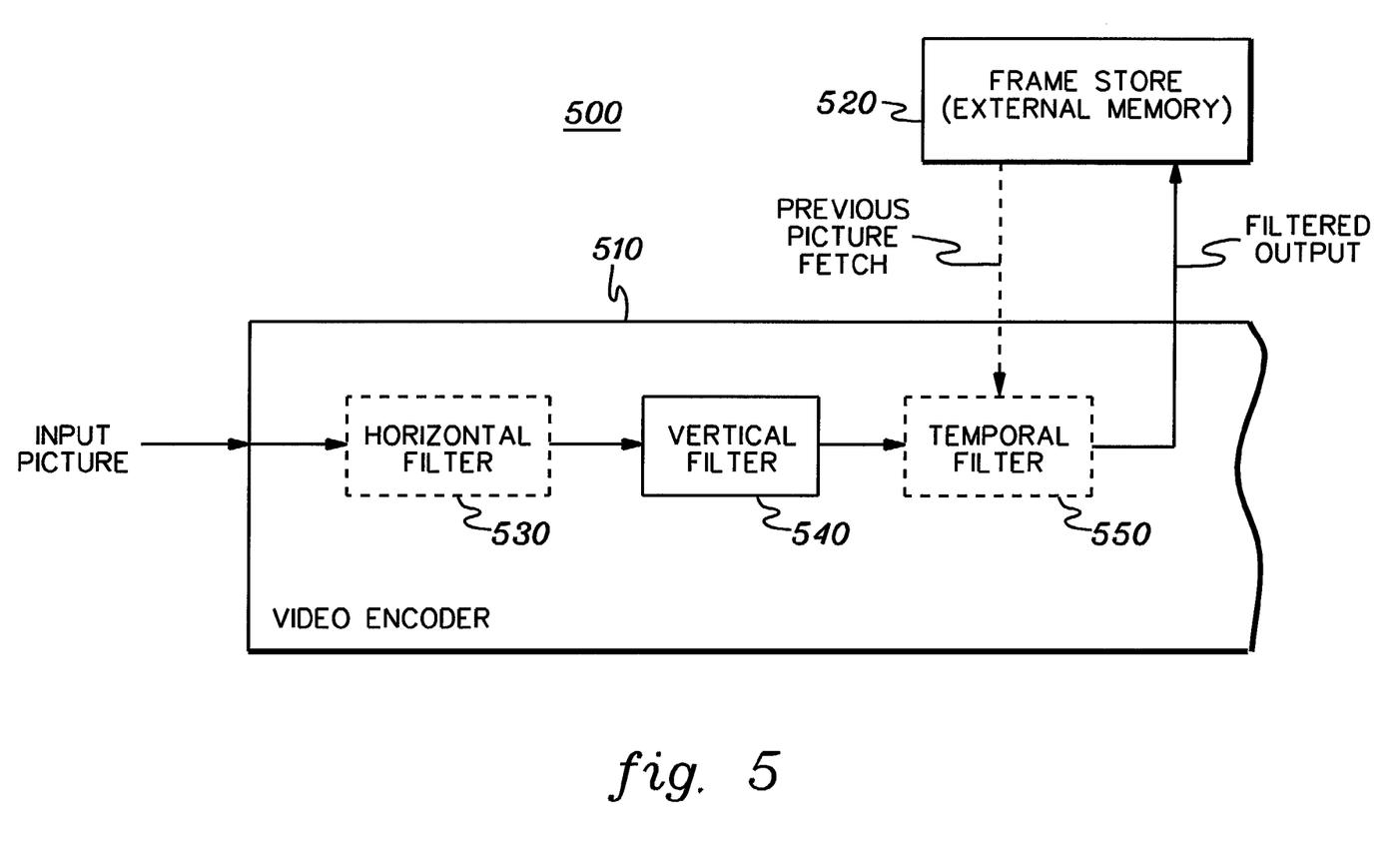
FIG. 5 illustrates one embodiment of a vertical filter integrated within a digital video encoder, in accordance with an aspect of the present invention.

In accordance with an aspect of the present invention, one embodiment of a video encode system, generally denoted 500, is depicted in FIG. 5. System 500 includes a video encoder 510 and an external frame store 520. Video encoder 510 includes a vertical filter 540, which (in one embodiment) may receive output from a horizontal filter 530 and provide input to a temporal filter 550. Filters 530 & 550 are optional, and are merely provided by way of illustration. An example of a horizontal filter is provided in the above-incorporated patent application entitled "Programmable Horizontal Filter With Noise Reduction and Image Scaling For Video Encoding System", by Ngai et al., U.S. Ser. No. 10/080,745, while an example of a temporal filter is described in the above-incorporated patent application entitled "Programmable and Adaptive Temporal Filter for Video Encoding", by Murdock et al., U.S. Ser. No. 10/080, 963.

Temporal filter 550 outputs filtered data to and retrieves filtered data from frame store 520. The retrieved filter data comprises filtered output of a previous picture for use in temporal filtering. Note that depending upon the video source, a user may program or choose whether to horizontally filter, vertically filter, and/or temporally filter a given set of video frames. The horizontal filter and the vertical filter comprise spatial filters, while the temporal filter is a time based filtering between frames of a video sequence. Further, although depicted in FIG. 5 as integrated within a video encoder, those skilled in the art should note that the horizontal filter, vertical filter and temporal filter depicted could collectively or individually comprise preprocessing logic disposed outside of the video encoder. That is, the vertical filter described and claimed hereinbelow could reside within the video encoder or external to the video encoder as preprocessing logic.

Figure 6:
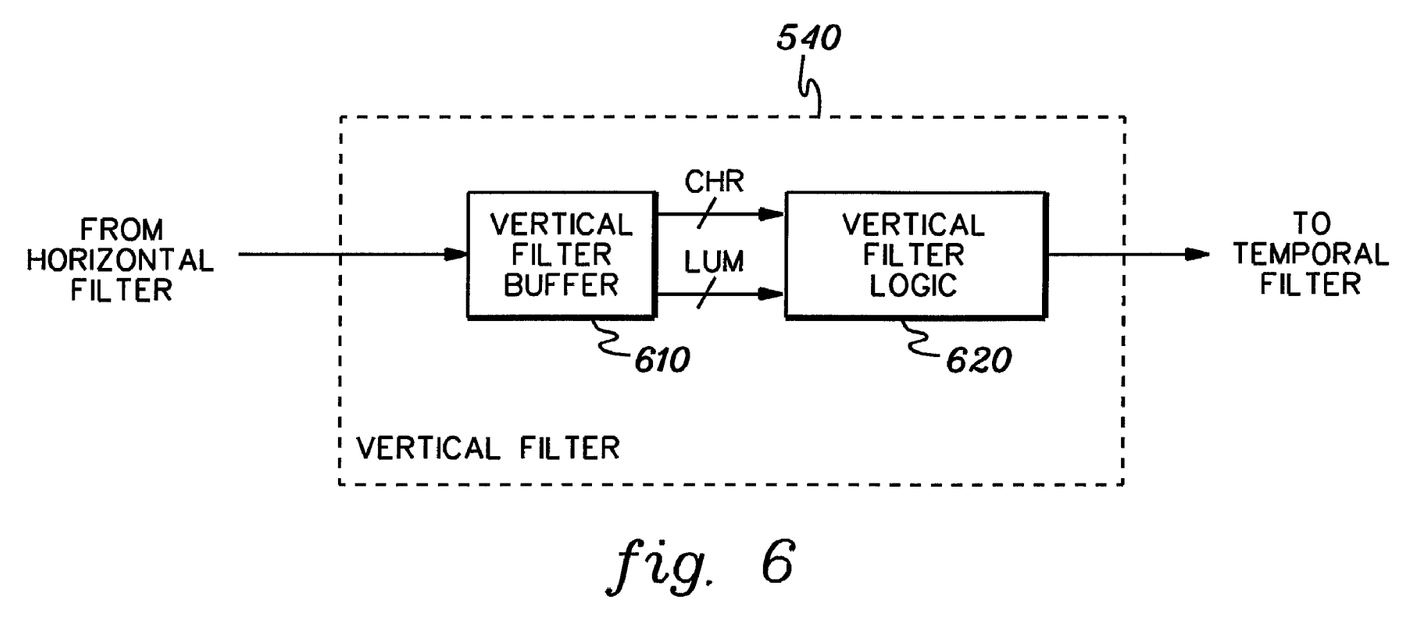
FIG. 6 depicts in greater detail one embodiment of the vertical filter of FIG. 5, in accordance with an aspect of the present invention.

FIG. 6 depicts one embodiment of a vertical filter 540 in accordance with an aspect of the present invention. Vertical filter 540 includes a vertical filter buffer 610 and vertical filter logic 620. Vertical filter buffer (VFB) 610 rearranges and temporarily holds the input pixel data until there is enough data for the vertical filter logic to process. Since input pixel data is received in horizontal order, the VFB buffers multiple pixel lines until the buffer can supply enough data for all input taps of the vertical filter employed. As used herein, a tap refers to pixel data of a particular line.

Thus, a four tap filter requires four vertically disposed pixels, while a five tap filter requires five vertically disposed pixels. Output from VFB 610 are luminance components (LUM) and chrominance components (CHR) of the pixel values to be filtered by the vertical filter logic. In accordance with the example of FIG. 5, input pixel values are received from the output of the horizontal filter, while output of the vertical filter logic is provided to the temporal filter.

Figure 7:
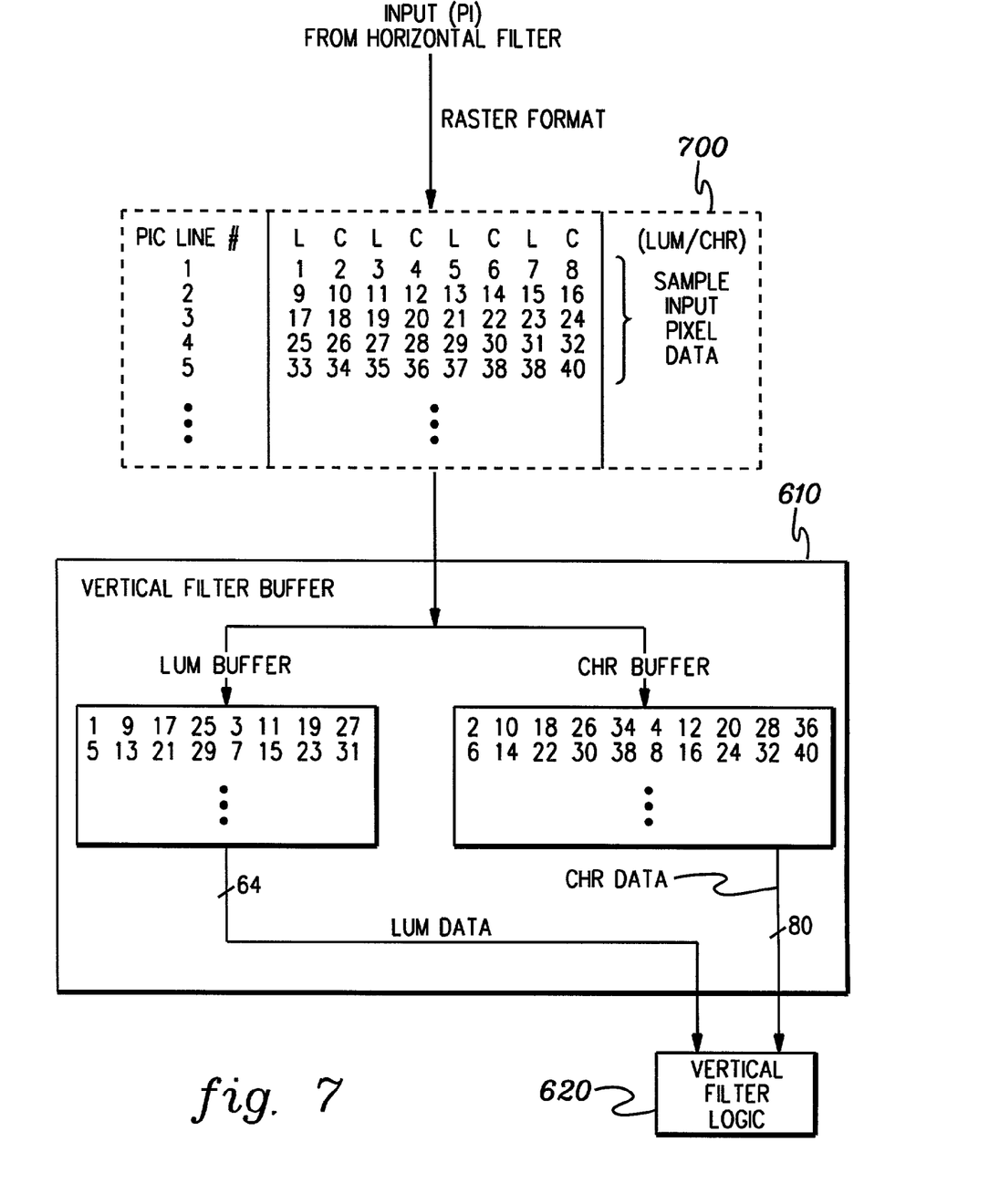
FIG. 7 illustrates one embodiment of a vertical filter buffer (VFB) of a vertical filter, in accordance with an aspect of the present invention.

One detailed example of a vertical filter buffer 610 in accordance with an aspect of the present invention is illustrated in FIG. 7. Data from the pixel interface, for example, pixel values from a horizontal filter, is received at VFB 610 in a raster or line by line horizontal format. One example of this format, generally denoted 700, is depicted in FIG. 7 wherein exemplary luminance (L) and chrominance (C) components for five picture lines are partially shown. This data comprises the pixel values received from the pixel interface. In one vertical filter design described in detail below, a four tap luminance component and a five tap chrominance component filter is employed. Thus, in FIG. 7, the VFB 610 is shown as a two port array that holds four vertical lines of luminance data written horizontally and five vertical lines of chrominance data written horizontally. The VFB separates the luminance and chrominance components into the two unique buffers (i.e., LUM buffer and CHR buffer). Data is sent out in this manner on the luminance bus (LUM DATA) and chrominance bus (CHR DATA), which in one example may comprise 64 bits and 80 bits, respectively. The data on the luminance and chrominance buses is forwarded to vertical filter logic 620.

In one embodiment, the write port of the VFB stores input pixel data horizontally and the read port retrieves pixel data vertically for sending to the vertical filter logic. In one example, the vertical filter produces one line of luminance data for every four input lines and one line of chrominance data for every five input lines. Therefore, the vertical filter might employ extra lines of input data to produce the correct number of output lines. For example, the VFB could automatically repeat lines of pixel data at the beginning and end of a picture to accomplish this. In the case of 4:2:0 input, the VFB will receive one line of chrominance data for every two lines of luminance. To maintain luminance and chrominance filtering in sync, and make the vertical filter output behave the same, the VFB could repeat every line of chrominance to make it look like 4:2:2 input to the vertical filter.

As an additional example, it may be necessary to repeat pixel lines at the vertical top and vertical bottom of a picture frame in order to obtain sufficient pixel values for the vertical filter algorithm employed. In the following example for a standard NTSC picture size, a first pixel line is repeated at the vertical top of the frame, and a last vertical pixel line is repeated at the vertical bottom of the video frame.

```
Vertical top
    1   R   1123 -> yields luminance filtered pixel 1
    1   x   1234 -> yields luminance filtered pixel 2
    2   x   2345 -> yields luminance filtered pixel 3
    3   x   etc . . .
    4   x
    5
    .
    .
    .
  717   x   717, 718, 719, 720 -> yields luminance filtered pixel 718
```

-continued

| | | |
|---|---|---|
| 718 | x | 718, 719, 720, 720 -> yields luminance filtered pixel 719 |
| 719 | x | 719, 720, 720, 720 -> yields luminance filtered pixel 720 |
| 720 | x | |
| 720 | R | |
| 720 | R | |
| Vertical bottom | | |

Where: R=Repeated pixel lines.

Figure 8:
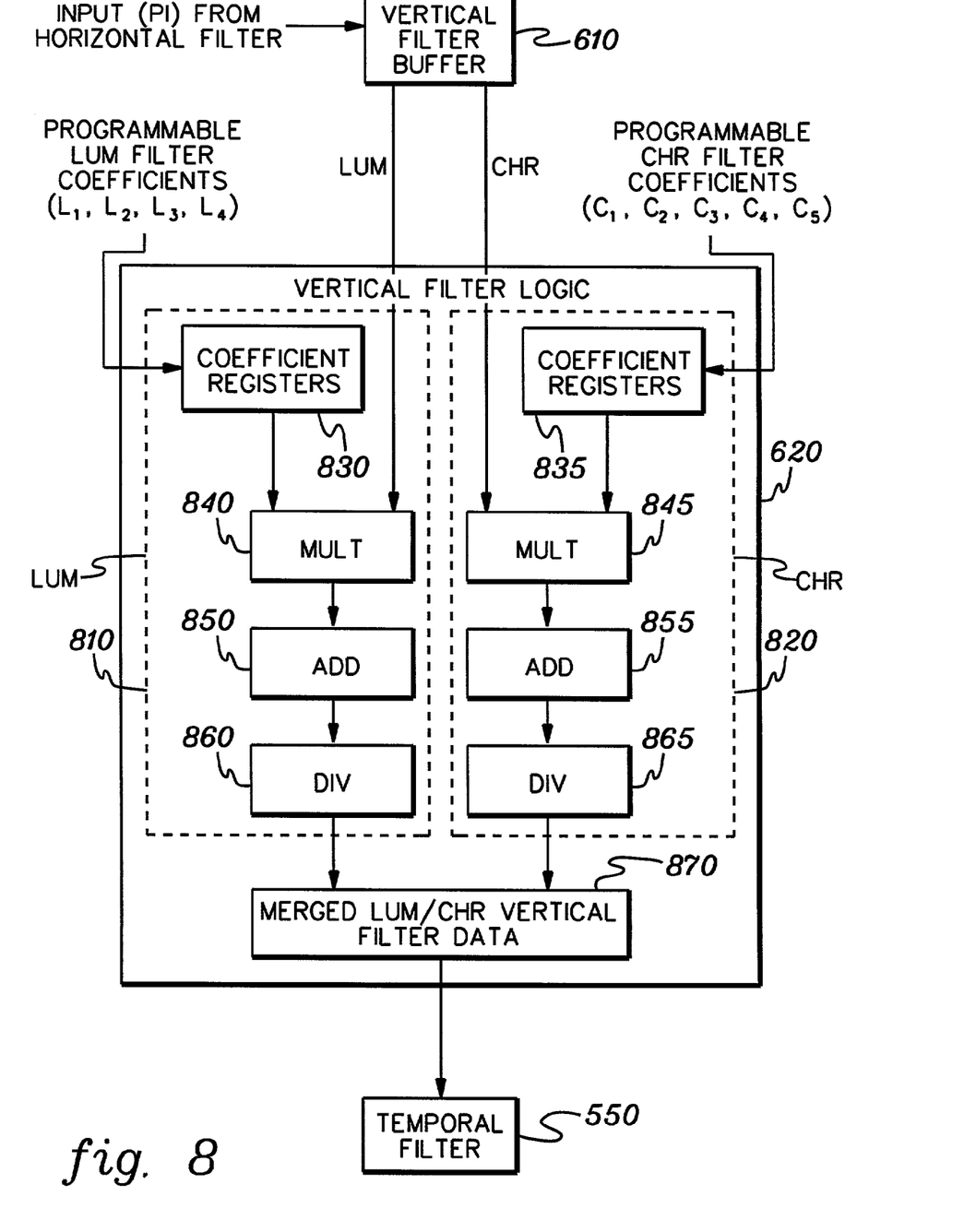
FIG. 8 illustrates one embodiment of vertical filter logic implemented by a vertical filter, in accordance with an aspect of the present invention.

Vertical filter logic 620 can implement various filter algorithms. For example, a four tap luminance and five tap chrominance filter could be employed such as set forth as equation (1) & (2) below:

$$Lum(\text{filtered}) = \frac{L_1 Pl_1 + L_2 Pl_2 + L_3 Pl_3 + L_4 Pl_4}{256} \quad (1)$$

where:

Lum(filtered)=one filtered pixel luminance component, $L_1$, $L_2$, $L_3$, $L_4$=programmable luminance filter coefficients, $Pl_1$, $Pl_2$, $Pl_3$, $Pl_4$=luminance component data for vertical pixels $P_1$, $P_2$, $P_3$, $P_4$ prior to vertical filtering; and $$Chr(\text{filtered}) = \frac{C_1 Pc_1 + C_2 Pc_2 + C_3 Pc_3 + C_4 Pc_4 + C_5 Pc_5}{256} \quad (2)$$

where:

Chr(filtered)=one filtered pixel chrominance component, $C_1$, $C_2$, $C_3$, $C_4$, $C_5$=programmable chrominance filter coefficients, and $Pc_1$, $Pc_2$, $Pc_3$, $Pc_4$, $Pc_5$=chrominance component data for vertical pixels $P_1$, $P_2$, $P_3$, $P_4$, $P_5$ prior to vertical filtering.

The following discussion assumes that vertical filter logic 610 of FIG. 8 implements filter equations (1) & (2) above.

In general, assuming that pixel data is entering the vertical filter logic, and that vertical filtering is enabled, four luminance filter coefficients and five chrominance filter coefficients would be loaded with or already reside in the luminance and chrominance coefficient registers for each pixel value to be filtered. In one embodiment, the vertical filter logic filters pixel values by multiplying each pixel value by a nine bit filter coefficient and then summing the luminance components together and dividing by 256, and summing the chrominance components together and dividing by 256, which yields the filtered results. Coefficient registers can be loaded at initialization or dynamically via a host interface allowing, e.g., a system user to change coefficients on a picture boundary as desired.

In one embodiment, three registers can be employed to control the vertical filter function. In this example, all three registers would be accessible by a user or user system.

Register (1) would be used to enable the filter and select among the noise filter options. With this register a user could select up to 4 noise filter options. No other registers would be needed since default coefficients could already have been loaded by microcode at initialization. At a high level, the 4 filtering choices might be as follows:

| Register (1) decode bits | Vertical Noise Filter level |
|---|---|
| 0000 | no filtering |
| 1001 | light filtering |
| 1010 | medium filtering |
| 1011 | medium to heavy filtering |
| 1100 | heavy filtering |

Example: WH REG 1x'9000' enables light vertical filtering.

The user could also specify custom coefficients. In this case, registers (2) and (3) would be written. Register (2) could contain the filter ID for the coefficients that will be loaded in register (3). For example:

| Register (2) decode bits | Vertical Noise Filter ID (for a light filter) |
|---|---|
| 0000 | luminance filter ID |
| 0001 | chrominance ODD field filter ID |
| 0010 | chrominance EVEN field filter ID. |

Register (3) would contain the 9 bit filter coefficient values. Consecutive writes to this register could be used, i.e., one write for each of the taps in the filter (4 for luminance and 5 for chrominance).

The following is an example of a light vertical filter using custom luminance coefficients:
WH REG 2x'0000' light luminance filter ID
WH REG 3x'0050' tap 0 luminance coefficient
WH REG 3x'0050' tap 1 luminance coefficient
WH REG 3x'0030' tap 2 luminance coefficient
WH REG 3x'0030' tap 3 luminance coefficient
WH REG 1x'9000' enables light vertical filtering.

When writing custom coefficients, one consideration to be followed is that the sum of all taps should equal 256 (i.e., in today's systems). The user could dynamically change noise reduction options and write custom coefficients at any time while encoding is in progress. The encoder (i.e., vertical filter logic) would apply the changes on the next input frame boundary. A user could also dynamically disable and then re-enable the vertical filter.

Returning now to the embodiment of FIG. 8, the luminance component data and chrominance component data separated by vertical filter buffer 610 are forwarded to vertical filter logic 620 for filtering, for example, in accordance with equations (1) & (2) above. From the vertical filter buffer both the luminance and chrominance pixel data are fed into multiplier logic 840, 845. If the vertical filter is enabled, luminance and chrominance coefficient data is also fed into (or already resides in) coefficient registers 830, 835. This coefficient data is programmable and can be loaded in several ways as noted above. (For example, the coefficient data could be loaded from microcode at initialization with default coefficients, or from a user via the host interface.) The luminance and chrominance pixel values are respectively multiplied with the luminance and chrominance coefficients in multipliers 840, 845. The products of the multiply logic are then added together 850, 855 and subsequently divided (e.g., by 256) 860, 865. The result is a vertically filtered luminance and chrominance pixel, which is reassembled 870 onto a LUM/CHR bus and sent to, for example, a temporal filter 550 for further processing.

Advantageously, the combined use of luminance and chrominance coefficients enable a user to vertically filter out even the noisiest of sources so that the encoded/decoded output is "cleaner" than the original. Dynamic changes in coefficients offer many options to users who may need to re-encode several times to arrive at a best picture quality. Coefficients can be changed on a picture by picture basis until an optimal set of coefficients is determined, thereby achieving a better picture.

Figure 9:
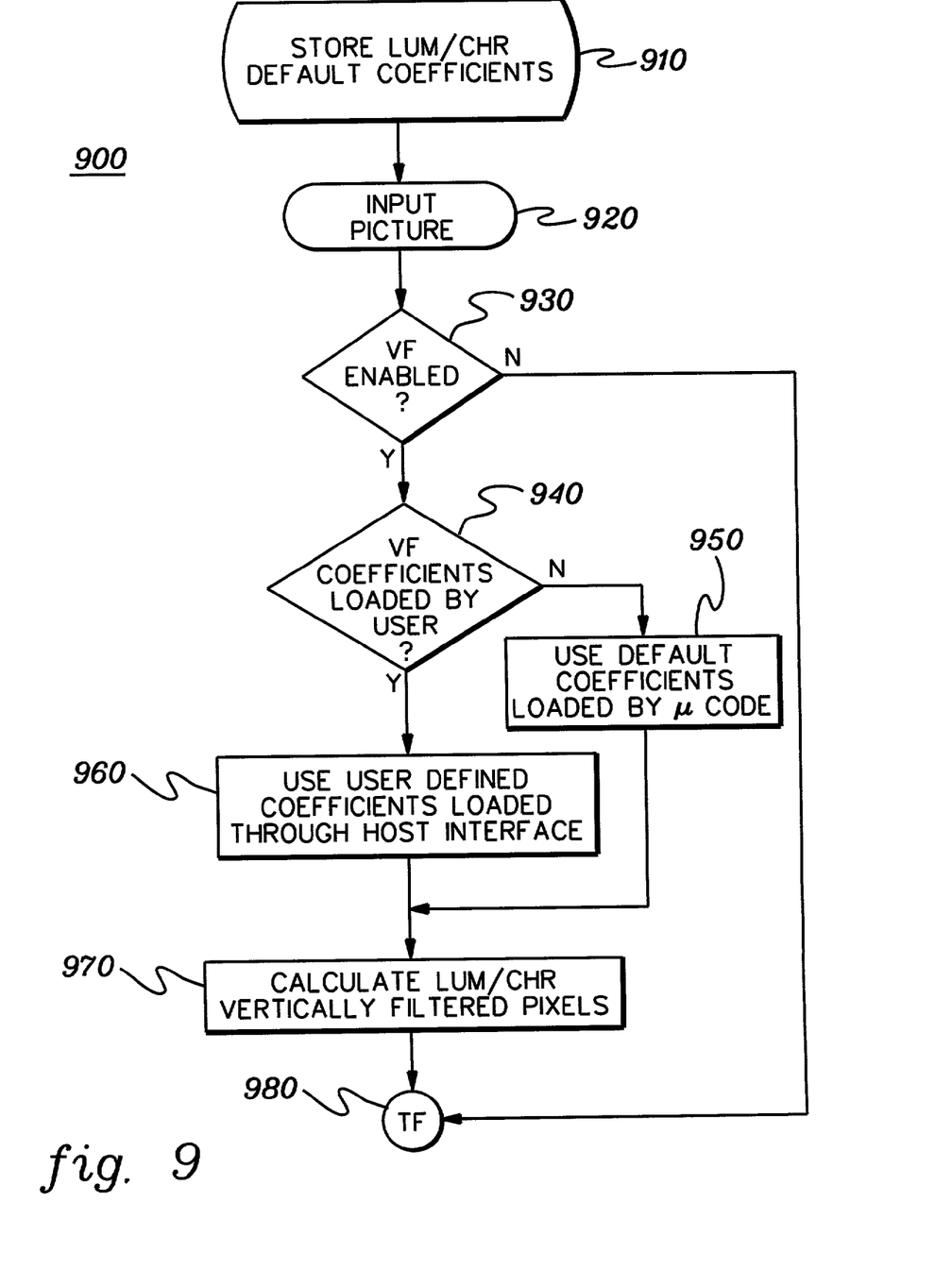
FIG. 9 illustrates one embodiment of a process for programmably vertically filtering pixel values, in accordance with an aspect of the present invention.

FIG. 9 depicts one flowchart embodiment of a vertical filter process 900 in accordance with the present invention. This filter process 900 assumes a storing of luminance default coefficients and chrominance default coefficients 910. Upon receipt of an input picture 920 processing determines whether vertical filtering is enabled 930. If "no", then the received pixel values are forwarded to subsequent logic (for example, within a digital video encoder), such as a temporal filter (TF) 980.

Assuming that vertical filtering is enabled, then processing determines whether vertical filter coefficients have been loaded by a user 940. If "no", then default coefficients in microcode are employed 950. Otherwise, the user defined coefficients loaded through the host interface are used in the vertical filter logic, such as described above. The vertically filtered luminance and chrominance pixel values are then calculated 970 using either the user defined coefficients or the default coefficients 970. Once calculated, the filtered pixel values are forwarded, in one embodiment, to a temporal filter (TF) 980.

Note that the default coefficients could comprise multiple sets of default coefficients preloaded into registers as described above. In such an example, a user system could select among the sets of default coefficients (e.g., on a per picture basis), or alternatively, could load through the host interface customized luminance and chrominance coefficients for use in the vertical filter (again on a per picture basis if desired).

Those skilled in the art will note from the above discussion that a programmable vertical filter is disclosed herein, which in one embodiment, may be integrated within a digital video encoder between, for example, a programmable horizontal filter and a programmable temporal filter.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to permit the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of filtering pixels of video frames of a sequence of video frames for facilitating video encoding thereof, said method comprising:
   prior to MPEG compression encoding of the video frames, obtaining pixel values of the video frames of the sequence of video frames;
   programmably vertically filtering noise from said pixel values of said video frames prior to said MPEG compression encoding, said programmably vertically filtering comprising obtaining vertical filter coefficients for use in vertically filtering said pixel values, wherein said vertical filter coefficients comprise at least two programmable luminance filter coefficients and at least two programmable chrominance filter coefficients, and wherein the programmably vertically filtering further comprises:
   separating luminance components and chrominance components of said pixel values in a vertical filter buffer;
   vertically filtering luminance components of said pixel values using said at least two programmable luminance filter coefficients and vertically filtering chrominance components of said pixel values using said at least two programmable chrominance filter coefficients;
   merging filtered luminance component data and filtered chrominance component data after said vertically filtering of luminance components and said vertically filtering of chrominance components; and
   further comprising performing at least one of said vertically filtering luminance components of said pixel values and said vertically filtering chrominance components of said pixel values, as follows:
   vertically filtering luminance components of said pixel values by determining filtered luminance component data using:

$$Lum(\text{filtered}) = \frac{L_1 Pl_1 + L_2 Pl_2 + L_3 Pl_3 + L_4 Pl_4}{256}$$

where:
   Lum(filtered)=a filtered pixel luminance component,
   $L_1, L_2, L_3, L_4$=programmable luminance filter coefficients,
   $Pl_1, Pl_2, Pl_3, Pl_4$=luminance component data for vertical pixels $P_1, P_2, P_3, P_4$ prior to vertical filtering; and vertically filtering chrominance components of said pixel values by determining filtered chrominance component data using:

$$Chr(\text{filtered}) = \frac{C_1 Pc_1 + C_2 Pc_2 + C_3 Pc_3 + C_4 Pc_4 + C_5 Pc_5}{256}$$

where:
Chr(filtered)=a filtered pixel chrominance component,
$C_1$, $C_2$, $C_3$, $C_4$, $C_5$=programmable chrominance filter coefficients, and
$Pc_1$, $Pc_2$, $Pc_3$, $Pc_4$, $Pc_5$=chrominance component data for vertical pixels $P_1$, $P_2$, $P_3$, $P_4$, $P_5$ prior to vertical filtering.

2. The method of claim 1, wherein said obtaining vertical filter coefficients comprises dynamically obtaining via a host interface new vertical filter coefficients during said programmably vertically filtering of pixel values.

3. The method of claim 1, wherein said vertical filter coefficients are dynamically programmable per video frame of the sequence of video frames for enhancing video encoding of the sequence of video frames.

4. A system for filtering pixels of video frames of a sequence of video frames for facilitating video encoding thereof, said system comprising:
means for obtaining, prior to MPEG compression encoding of video frames, pixel values of the video frames of the sequence of video frames;
means for programmably vertically filtering noise from said pixel values of said video frames prior to said MPEG compression encoding, said means for programmably vertically filtering comprising means for obtaining vertical filter coefficients for use in vertically filtering said pixel values, wherein said vertical filter coefficients comprise at least two programmable luminance filter coefficients and at least two programmable chrominance filter coefficients, and wherein said means for programmably vertically filtering further comprises:
means for separating luminance components and chrominance components of said pixel values in a vertical filter buffer;
means for vertically filtering luminance components of said pixel values using said at least two programmable luminance filter coefficients and for vertically filtering chrominance components of said pixel values using said at least two programmable chrominance filter coefficients;
means for merging filtered luminance component data and filtered chrominance component data after said vertically filtering of luminance components and said vertically filtering of chrominance components; and
further comprising means for performing at least one of said means for vertically filtering luminance components of said pixel values and said means for vertically filtering chrominance components of said pixel values, as follows:
means for vertically filtering luminance components of said pixel values by determining filtered luminance component data using:

$$Lum(\text{filtered}) = \frac{L_1 Pl_1 + L_2 Pl_2 + L_3 Pl_3 + L_4 Pl_4}{256}$$

where:
Lum(filtered)=a filtered pixel luminance component,
$L_1, L_2, L_3, L_4$=programmable luminance filter coefficients,
$Pl_1$, $Pl_2$, $Pl_3$, $Pl_4$=luminance component data for vertical pixels $P_1$, $P_2$, $P_3$, $P_4$ prior to vertical filtering; and
means for vertically filtering chrominance components of said pixel values by determining filtered chrominance component data using:

$$Chr(\text{filtered}) = \frac{C_1 Pc_1 + C_2 Pc_2 + C_3 Pc_3 + C_4 Pc_4 + C_5 Pc_5}{256}$$

where:
Chr(filtered)=a filtered pixel chrominance component,
$C_1$, $C_2$, $C_3$, $C_4$, $C_5$=programmable chrominance filter coefficients, and
$Pc_1$, $Pc_2$, $Pc_3$, $Pc_4$, $Pc_5$=chrominance component data for vertical pixels $P_1$, $P_2$, $P_3$, $P_4$, $P_5$ prior to vertical filtering.

5. The system of claim 4, wherein said means for obtaining vertical filter coefficients comprises means for dynamically obtaining via a host interface new vertical filter coefficients during said programmably vertically filtering of pixel values.

6. The system of claim 4, wherein said vertical filter coefficients are dynamically programmable per video frame of the sequence of video frames for enhancing video encoding of the sequence of video frames.

7. At least one program storage device readable by a machine, tangibly embodying at least one program of instructions executable by the machine to perform a method of filtering pixels of video frames of a sequence of video frames for facilitating video encoding thereof, said method comprising:
prior to MPEG compression encoding of the video frames, obtaining pixel values of the video frames of the sequence of video frames; and
programmably vertically filtering noise from said pixel values of said video frames prior to said MPEG compression encoding, said programmably vertically filtering comprising obtaining vertical filter coefficients for use in vertically filtering said pixel values, wherein said vertical filter coefficients comprise at least two programmable luminance filter coefficients and at least two programmable chrominance filter coefficients, and wherein the programmably vertically filtering further comprises:
separating luminance components and chrominance components of said pixel values in a vertical filter buffer;
vertically filtering luminance components of said pixel values using said at least two programmable luminance filter coefficients and vertically filtering chrominance components of said pixel values using said at least two programmable chrominance filter coefficients;
merging filtered luminance component data and filtered chrominance component data after said vertically filtering of luminance components and said vertically filtering of chrominance components; and further comprising performing at least one of said vertically filtering luminance components of said pixel values and said vertically filtering chrominance components of said pixel values, as follows:

vertically filtering luminance components of said pixel values by determining filtered luminance component data using:

$$Lum(\text{filtered}) = \frac{L_1 Pl_1 + L_2 Pl_2 + L_3 Pl_3 + L_4 Pl_4}{256}$$

where:

Lum(filtered)=a filtered pixel luminance component, $L_1, L_2, L_3, L_4$=programmable luminance filter coefficients, $Pl_1, Pl_2, Pl_3, Pl_4$=luminance component data for vertical pixels $P_1, P_2, P_3, P_4$ prior to vertical filtering; and vertically filtering chrominance components of said pixel values by determining filtered chrominance component data using:

$$Chr(\text{filtered}) = \frac{C_1 Pc_1 + C_2 Pc_2 + C_3 Pc_3 + C_4 Pc_4 + C_5 Pc_5}{256}$$

where:

Chr(filtered)=a filtered pixel chrominance component, $C_1, C_2, C_3, C_4, C_5$=programmable chrominance filter coefficients, and $Pc_1, Pc_2, Pc_3, Pc_4, Pc_5$=chrominance component data for vertical pixels $P_1, P_2, P_3, P_4, P_5$ prior to vertical filtering.

8. The at least one program storage device of claim 7, wherein said obtaining vertical filter coefficients comprises dynamically obtaining via a host interface new vertical filter coefficients during said programmably vertically filtering of pixel values.

* * * * *

UNITED STATES PATENT AND TRADEMARK OFFICE
CERTIFICATE OF CORRECTION

PATENT NO. : 6,980,598 B2
DATED : December 27, 2005
INVENTOR(S) : Greenfield et al.

It is certified that error appears in the above-identified patent and that said Letters Patent is hereby corrected as shown below:

<u>Column 6,</u>
Line 37, delete "ith" and insert -- $i^{th}$ --.

<u>Column 7,</u>
Line 7, between "of" and "coefficient" delete "-".

Signed and Sealed this

Twenty-first Day of March, 2006

JON W. DUDAS
*Director of the United States Patent and Trademark Office*